(12) United States Patent
Hirano et al.

(10) Patent No.: US 8,023,476 B2
(45) Date of Patent: Sep. 20, 2011

(54) RADIO COMMUNICATION METHOD, RADIO COMMUNICATION TERMINAL ACCOMMODATING APPARATUS, AND RADIO COMMUNICATION TERMINAL

(75) Inventors: Jun Hirano, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 10/571,200

(22) PCT Filed: Sep. 10, 2004

(86) PCT No.: PCT/JP2004/013569
§ 371 (c)(1),
(2), (4) Date: Nov. 9, 2006

(87) PCT Pub. No.: WO2005/027423
PCT Pub. Date: Mar. 24, 2005

(65) Prior Publication Data
US 2007/0109981 A1 May 17, 2007

(30) Foreign Application Priority Data

Sep. 12, 2003 (JP) .................................. 2003-322145

(51) Int. Cl.
*H04W 4/00* (2009.01)
(52) U.S. Cl. ........ 370/338; 370/315; 370/335; 370/329; 370/337; 455/417; 455/414; 455/466; 455/528
(58) Field of Classification Search .................. 370/315, 370/335, 329, 338, 337, 325, 445; 455/417, 455/414, 566, 528, 13, 25; 375/211, 267, 375/347
See application file for complete search history.

(56) References Cited

U.S. PATENT DOCUMENTS

| | | | | |
|---|---|---|---|---|
| 5,884,171 A * | 3/1999 | Tanabe et al. | .................. | 455/434 |
| 6,240,124 B1 * | 5/2001 | Wiedeman et al. | ........... | 375/130 |
| 6,611,508 B1 * | 8/2003 | Abe | .............................. | 370/332 |
| 6,693,891 B1 * | 2/2004 | Sugita et al. | .................. | 370/345 |

(Continued)

FOREIGN PATENT DOCUMENTS

JP 58206257 12/1983

(Continued)

OTHER PUBLICATIONS

PCT International Search Report dated Dec. 21, 2004.

(Continued)

*Primary Examiner* — Nick Corsaro
*Assistant Examiner* — Mahendra Patel
(74) *Attorney, Agent, or Firm* — Dickinson Wright PLLC

(57) ABSTRACT

A technique for enabling a configuration of an entire radio communication system to be grasped in a manner of bird's-eye is disclosed. In the radio communication system provided with one radio communication terminal accommodating apparatus 101 and a plurality of radio communication terminals 102a to 102e accommodated in this radio communication terminal accommodating apparatus by using the technique, each radio communication terminal transmits identification information of a self-terminal, and monitors a radio transmission medium, and then acquires identification information of a different radio communication terminal transmitted from a different radio communication terminal. Then, each radio communication terminal reports the acquired identification information of the different radio communication terminal to the radio communication terminal accommodating apparatus, and the radio communication terminal accommodating apparatus generates information indicating a relation of a detection of an existence between the plurality of radio communication terminals, in accordance with the report of those identification information, and grasp the configuration of the entire radio communication system in the manner of the bird's-eye.

15 Claims, 5 Drawing Sheets

TARGET OF DETECTION

| | | ① | ② | ③ | ④ | ⑤ |
|---|---|---|---|---|---|---|
| MAIN BODY OF DETECTION | ① | | O | × | O | O |
| | ② | O | | O | O | × |
| | ③ | O | O | | × | × |
| | ④ | O | × | × | | O |
| | ⑤ | O | O | O | O | |

U.S. PATENT DOCUMENTS

| | | | |
|---|---|---|---|
| 6,895,258 B1* | 5/2005 | Scherzer et al. | 455/562.1 |
| 7,126,924 B2* | 10/2006 | Suzuki et al. | 370/311 |
| 7,280,800 B2* | 10/2007 | Morino | 455/15 |
| 7,715,850 B2* | 5/2010 | Lin | 455/456.1 |
| 2001/0024434 A1* | 9/2001 | Ayyagari et al. | 370/347 |
| 2002/0046271 A1 | 4/2002 | Huang | |
| 2002/0062388 A1 | 5/2002 | Ogier | |
| 2002/0131376 A1* | 9/2002 | Wheatley et al. | 370/328 |
| 2002/0145978 A1 | 10/2002 | Batsell | |
| 2002/0187783 A1* | 12/2002 | Sugaya | 455/435 |
| 2003/0119500 A1 | 6/2003 | Mukherjee | |
| 2003/0148756 A1* | 8/2003 | Onishi et al. | 455/414 |
| 2003/0162495 A1* | 8/2003 | Yonemoto et al. | 455/7 |
| 2003/0179763 A1* | 9/2003 | Horiba | 370/420 |
| 2004/0204068 A1* | 10/2004 | Komaki | 455/556.1 |
| 2006/0003710 A1* | 1/2006 | Nakagawa et al. | 455/101 |
| 2006/0165024 A1* | 7/2006 | Iwami et al. | 370/315 |

FOREIGN PATENT DOCUMENTS

| | | |
|---|---|---|
| JP | 11251992 | 9/1999 |
| JP | 2003249936 | 9/2003 |
| WO | 01/15112 | 3/2001 |
| WO | 02/43335 | 5/2002 |

OTHER PUBLICATIONS

"Radio Line Asymmetrical Adaptation Route Control System APFS", IC98, Japan Society for Software Science and Technology, pp. 107-116, 1998 (with an extract English translation starting from Sec 3 and ending at Sec 4.4. of the Japanese text).

Supplementary European Search Report dated May 26, 2010.

* cited by examiner

FIG. 2

TARGET OF DETECTION

|  | ① | ② | ③ | ④ | ⑤ |
|---|---|---|---|---|---|
| ① |  | O | × | O | O |
| ② | O |  | O | O | × |
| ③ | O | O |  | × | × |
| ④ | O | × | × |  | O |
| ⑤ | O | O | O | O |  |

MAIN BODY OF DETECTION

TARGET OF DETECTION

| MAIN BODY OF DETECTION | | ① | ② | ③ | ④ | ⑤ |
|---|---|---|---|---|---|---|
| | ① | | ? | × | ○ | ○ |
| | ② | ? | | ○ | ○ | × |
| | ③ | ○ | ○ | | × | × |
| | ④ | ○ | × | × | | ○ |
| | ⑤ | ○ | ○ | ○ | ○ | |

RADIO COMMUNICATION METHOD, RADIO COMMUNICATION TERMINAL ACCOMMODATING APPARATUS, AND RADIO COMMUNICATION TERMINAL

TECHNICAL FIELD

The present invention relates to a radio communication method in a radio communication system which uses a radio communication and carries out a transmission/reception of data between a plurality of radio communication terminals, and a radio communication terminal accommodating apparatus and a radio communication terminal which constitute the radio communication system.

BACKGROUND ART

Conventionally, there is a radio communication network which uses a radio communication and carries out an exchange of data between a plurality of radio communication terminals. A radio communication method in this radio communication network is roughly classified into: a communication method of a centralized control type where there is a radio communication terminal for managing a communication between different radio communication terminals (hereafter, the radio communication terminal for managing this communication is referred to as a radio communication terminal accommodating apparatus) and a communication permission is given to each radio communication terminal by this radio communication terminal accommodating apparatus; and a communication method of a decentralized control where there is not the radio communication terminal accommodating apparatus, and each radio communication terminal carries out a check (carrier sense) of a communication state in a transmission medium and accesses a radio transmission medium (hereafter, referred to as a transmission medium).

In the communication method of the centralized control type, the radio communication terminal accommodating apparatus serves as a master, and each of the plurality of radio communication terminals accommodated in this radio communication terminal accommodating apparatus serves as a slave. Then, the radio communication terminal accommodating apparatus carries out the communication through the radio transmission medium with each of the plurality of radio communication terminals and controls the communication in each of the plurality of radio communication terminals.

On the other hand, for example, the following non-patent document 1 notes a route control system for retrieving a relay route whose transmission efficiency is better, in a network that uses a radio transmission path where a variation in a transmission property is large. In this route control system, since each node broadcasts a time when an error bit number of a reception packet from an adjacent node, a reception line band width of a self-node, and a line quality are measured, the nodes adjacent to each other can grasp the respective line states, and moreover, since each node broadcasts the line state received from the adjacent node in its original state, the line state of each node is spread to the node that is further adjacent to the adjacent node, and all of the nodes in the network can finally grasp the line states of the respective nodes in the network. The technical idea noted in this non-patent document 1 is such that OSPF (Open Shortest Path First) that is the conventional route control method is applied to the radio communication, and each node uses the line state of a different node in the network as route information.

Non-Patent Document 1: "Radio Line Asymmetrical Adaptation Route Control System APFS", IC98, Japan Society for Software Science and Technology, pp 107-116, However, unless the radio communication terminal accommodating apparatus accurately grasps the information indicating the relation of the communication between the accommodated respective radio communication terminals (the information such as [a radio communication terminal which can be detected by a certain radio communication terminal], [a radio communication terminal to which information transmitted from a certain radio communication terminal is delivered] or the like), this disables the accommodated radio communication terminal to carry out the communication of an excellent efficiency and further disables a direct communication (side stream) between parallel radio communication terminals. Also, this may lead to a fear where the communication between the radio communication terminals induces interference.

Also, according to the technique noted in the non-patent document 1, since the line state of each node is gradually spread to the node further adjacent to the adjacent node, it takes a long time until all of the nodes in the network grasp the line states of the respective nodes, and the traffic in the network is increased. Also, moreover, in the case of the radio communication, since the various states such as the line states and the like are changed from moment to moment, the state related to the foregoing communication is required to be instantly reflected in the communication. However, the technique noted in the non-patent document 1 cannot cope with the foregoing instant change. Thus, the information spread with a time is not said to be the information, which is accurate and meaningful, depending on the environment where the radio communication state is changed.

DISCLOSURE OF THE INVENTION

In order to solve the above-mentioned problems, the present invention has an object to provide a radio communication method that can grasp a configuration of an entire radio communication system in a manner of bird's-eye, even under an environment where a change in a radio communication state is relatively large, and a radio communication terminal accommodating apparatus and a radio communication terminal which constitutes this radio communication system.

In order to solve the above-mentioned object, a radio communication method of the present invention is a radio communication method in a radio communication system, wherein one radio communication terminal accommodating apparatus and a plurality of radio communication terminals accommodated in the radio communication terminal accommodating apparatus carry out communication between them through radio transmission medium, and each of the plurality of radio communication terminals transmits identification information of a self-terminal, and each of the plurality of radio communication terminals acquires the identification information of a different radio communication terminal that can monitor the communication, and each of the plurality of radio communication terminals transmits the identification information of the different radio communication terminal to the radio communication terminal accommodating apparatus, and the radio communication terminal accommodating apparatus generates information indicating a relation of a detection of an existence between the plurality of radio communication terminals, in accordance with the identification information of the different radio communication terminal received from each of the plurality of radio communication terminals.

Consequently, the radio communication terminal accommodating apparatus can grasp the configuration of the entire radio communication system in the manner of the bird's-eye.

Moreover, the present invention is designed such that each of the plurality of radio communication terminals periodically transmits the identification information of the different radio communication terminal to the radio communication terminal accommodating apparatus, and the radio communication terminal accommodating apparatus generates information indicating a time change in the relation of the detection of the existence between the plurality of radio communication terminals, in accordance with the identification information of the different radio communication terminal periodically received from each of the plurality of radio communication terminals.

Consequently, the radio communication terminal accommodating apparatus can grasp the configuration of the entire radio communication system in the manner of the bird's-eye and grasp the temporal change, even if the movement of the radio communication terminal or another factor causes a communication environment to be changed.

Moreover, the present invention is designed such that the radio communication terminal accommodating apparatus detects an existence of a radio communication terminal or radio communication terminal accommodating apparatus, which cannot be directly detected by the radio communication terminal accommodating apparatus, in accordance with the identification information of the different radio communication terminal received from each of the plurality of radio communication terminals, and are located around each of the plurality of radio communication terminals.

Consequently, the radio communication terminal accommodating apparatus can recognize the radio communication terminal and radio communication terminal accommodating apparatus, which are not accommodated in the radio communication terminal accommodating apparatus and belong to an external radio communication system, and in the radio communication system, the communication where the influence caused by those radio communication terminal and radio communication terminal accommodating apparatus, which belong to the external radio communication system, is considered becomes possible.

Moreover, the present invention is designed such that each of the plurality of radio communication terminals acquires the identification information of a different radio communication terminal that can monitor a communication and also acquires information related to a communication with the different radio communication terminal, and each of the plurality of radio communication terminals transmits the identification information of the different radio communication terminal to the radio communication terminal accommodating apparatus and transmits the information related to the communication with the different radio communication terminal, and the radio communication terminal accommodating apparatus generates the information related to the communication between the plurality of radio communication terminals, in accordance with the information related to the communication with the different radio communication terminal received from each of the plurality of radio communication terminals.

Consequently, the radio communication terminal accommodating apparatus can grasp the configuration of the entire radio communication system in the manner of the bird's-eye and further grasp the communication state between the respective radio communication terminals and the like.

Moreover, the present invention is designed such that each of the plurality of radio communication terminals acquires the identification information of a different radio communication terminal which can monitor a communication and also acquires the information related to the communication with the different radio communication terminal, and each of the plurality of radio communication terminals transmits the identification information of the different radio communication terminal to the radio communication terminal accommodating apparatus and information related to a communication performance of a self radio communication terminal, and also transmits the information related to the communication with the different radio communication terminal, and the radio communication terminal accommodating apparatus generates the information related to the communication between the plurality of radio communication terminals, in accordance with the information related to the communication with the different radio communication terminal received from each of the plurality of radio communication terminals and the information related to the communication performance of each radio communication terminal.

Consequently, the radio communication terminal accommodating apparatus can grasp the configuration of the entire radio communication system in the manner of the bird's-eye and further grasp the communication state between the respective radio communication terminals and the like.

Moreover, the present invention is designed such that each of the plurality of radio communication terminals periodically transmits the information related to the communication with the different radio communication terminal to the radio communication terminal accommodating apparatus, and the radio communication terminal accommodating apparatus generates the information indicating the time change in the communication state between the plurality of radio communication terminals, in accordance with the information related to the communication with the different radio communication terminal periodically received from each of the plurality of radio communication terminals.

Consequently, the radio communication terminal accommodating apparatus can grasp the configuration of the entire radio communication system in the manner of the bird's-eye, and further grasp the communication state between the respective radio communication terminals and the like, and also grasp the temporal change, even if the movement of the radio communication terminal or another factor causes a communication environment to be changed.

Moreover, the present invention is designed such that each of the plurality of radio communication terminals periodically transmits the information related to the communication with the different radio communication terminal and the information related to the communication performance of the self radio communication terminal to the radio communication terminal accommodating apparatus, and the radio communication terminal accommodating apparatus generates the information indicating the time change in the communication state between the plurality of radio communication terminals, in accordance with the information related to the communication with the different radio communication terminal periodically received from each of the plurality of radio communication terminals and the information related to the communication performance of each radio communication terminal.

Consequently, the radio communication terminal accommodating apparatus can grasp the configuration of the entire radio communication system in the manner of the bird's-eye, and further grasp the communication state between the respective radio communication terminals and the like, and also grasp the temporal change, even if the movement of the radio communication terminal or another factor causes the communication environment to be changed.

Moreover, the present invention is designed such that the radio communication terminal accommodating apparatus acquires information related to a communication between each of the plurality of radio communication terminals and a radio communication terminal or radio communication terminal accommodating apparatus, which cannot be directly detected by the radio communication terminal accommodating apparatus, in accordance with the information related to the communication with the different radio communication terminal received from each of the plurality of radio communication terminals, and are located around each of the plurality of radio communication terminals.

Consequently, the radio communication terminal accommodating apparatus can recognize the radio communication terminal and radio communication terminal accommodating apparatus, which are not accommodated in the radio communication terminal accommodating apparatus and belong to the external radio communication system, and further grasp the communication state with those radio communication terminal and radio communication terminal accommodating apparatus, which belong to the external radio communication system, and in the radio communication system, the communication where the influence caused by the radio communication terminal and radio communication terminal accommodating apparatus, which belong to the external radio communication system, is considered becomes possible.

Moreover, the present invention is designed such that the information related to the communication with the different radio communication terminal has any one of: an electric power level or error rate of a signal which the radio communication terminal receives from the different radio communication terminal or the radio communication terminal accommodating apparatus; a variation amount in the electric power level or error rate; a direction from a position of the radio communication terminal to the different radio communication terminal or the radio communication terminal accommodating apparatus; and a variation amount in the direction.

Consequently, the radio communication terminal accommodating apparatus can grasp the information related to the communication between the respective radio communication terminals, such as an effective distance in the communication between the respective radio communication terminals and the like.

Moreover, the present invention is designed such that the information related to the communication performance of each radio communication terminal has any one of: a movement direction or movement speed of the radio communication terminal; a kind of a communication interface possessed by the radio communication terminal; a transmission directivity that can be generated by the radio communication terminal; and a reception directivity.

Consequently, the radio communication terminal accommodating apparatus can grasp the information related to the communication in each radio communication terminal, such as the communication performance of each radio communication terminal and the like.

Moreover, the present invention is designed such that the radio communication terminal accommodating apparatus refers to the information indicating the relation of the detection of the existence between the plurality of radio communication terminals and allows a communication between the two radio communication terminals among the plurality of radio communication terminals and a communication between the different two radio communication terminals which does not overlap with the communication between the two radio communication terminals at the same time.

Consequently, the radio communication terminal accommodating apparatus enables the communication in which the usage efficiency of radio resources is excellent with the plurality of side streams (the simultaneous communication between the radio communication terminals).

Also, in order to attain the above-mentioned objects, a radio communication terminal accommodating apparatus of the present invention is a radio communication terminal accommodating apparatus, which carries out a communication through a radio transmission medium with each of a plurality of radio communication terminals and accommodates each of the plurality of radio communication terminals and has: receiving means for receiving the identification information of a different radio communication terminal, which is transmitted from each of the plurality of radio communication terminals and in which each of the plurality of radio communication terminals can monitor a communication; and correlation information generating means for generating information indicative of a relation of a detection of an existence between the plurality of radio communication terminals, in accordance with the identification information of the different radio communication terminal received from each of the plurality of radio communication terminals.

With this configuration, the radio communication terminal accommodating apparatus can grasp the configuration of the entire radio communication system in the manner of the bird's-eye Moreover, the radio communication terminal accommodating apparatus of the present invention has communication information generating means, which if information related to a communication with the different radio communication terminal from each of the plurality of radio communication terminals is received by the receiving means, generates the information related to the communication between the plurality of radio communication terminals.

With this configuration, the radio communication terminal accommodating apparatus can grasp the configuration of the entire radio communication system in the manner of the bird's-eye and further grasp the communication state between the respective radio communication terminals and the like.

Moreover, the radio communication terminal accommodating apparatus of the present invention has communication information generating means, which if information related to a communication performance of each radio communication terminal from each of the plurality of radio communication terminals is received by the receiving means, in accordance with the information related to the communication performance of each radio communication terminal, generates the information related to the communication between the plurality of radio communication terminals.

With this configuration, the radio communication terminal accommodating apparatus can grasp the configuration of the entire radio communication system in the manner of the bird's-eye and further grasp the communication state between the respective radio communication terminals and the like.

Also, in order to attain the above-mentioned objects, a radio communication terminal of the present invention is a radio communication terminal which carries out a communication through a radio transmission medium with a radio communication terminal accommodating apparatus and is accommodated in the radio communication terminal accommodating apparatus and has: self-terminal identification information transmitting means for transmitting identification information of a self-terminal; identification information acquiring means for acquiring identification information of a different radio communication terminal which can monitor a communication; and acquirement identification information transmitting means for transmitting the identification information of the different radio communication terminal to the radio communication terminal accommodating apparatus.

With this configuration, the radio communication terminal accommodating apparatus can grasp the configuration of the entire radio communication system in the manner of the bird's-eye.

Moreover, the radio communication terminal of the present invention has: communication information acquiring means for acquiring the information related to the communication with the different radio communication terminal; and acquirement communication information transmitting means for transmitting the information related to the communication with the different radio communication terminal to the radio communication terminal accommodating apparatus.

With this configuration, the radio communication terminal accommodating apparatus can grasp the configuration of the entire radio communication system in the manner of the bird's-eye and further grasp the communication state between the respective radio communication terminals and the like.

Moreover, the radio communication terminal of the present invention has: communication performance information acquiring means for acquiring the information related to the communication performance of a self radio communication terminal; and acquirement communication information transmitting means for transmitting the information related to the communication performance of the self radio communication terminal to the radio communication terminal accommodating apparatus.

With this configuration, the radio communication terminal accommodating apparatus can grasp the configuration of the entire radio communication system in the manner of the bird's-eye and further grasp the communication state between the respective radio communication terminals and the like.

A radio communication method of the present invention is a radio communication method in a radio communication system, wherein one radio communication terminal accommodating apparatus and a plurality of radio communication terminals accommodated in the radio communication terminal accommodating apparatus carry out communication between them through radio transmission medium, and each of the plurality of radio communication terminals transmits identification information of a self-terminal, and each of the plurality of radio communication terminals acquires the identification information of a different radio communication terminal that can monitor the communication, and each of the plurality of radio communication terminals transmits the identification information of the different radio communication terminal to the radio communication terminal accommodating apparatus, and the radio communication terminal accommodating apparatus generates information indicating a relation of a detection of an existence between the plurality of radio communication terminals, in accordance with the identification information of the different radio communication terminal received from each of the plurality of radio communication terminals. Thus, the radio communication terminal accommodating apparatus can grasp the configuration of the entire radio communication system in the manner of the bird's-eye.

Also, a radio communication terminal accommodating apparatus of the present invention is a radio communication terminal accommodating apparatus, which carries out a communication through a radio transmission medium with each of a plurality of radio communication terminals and accommodates each of the plurality of radio communication terminals and has: receiving means for receiving the identification information of a different radio communication terminal, which is transmitted from each of the plurality of radio communication terminals and in which each of the plurality of radio communication terminals can monitor a communication; and correlation information generating means for generating information indicative of a relation of a detection of an existence between the plurality of radio communication terminals, in accordance with the identification information of the different radio communication terminal received from each of the plurality of radio communication terminals. Thus, the radio communication terminal accommodating apparatus can grasp the configuration of the entire radio communication system in the manner of the bird's-eye.

Also, a radio communication terminal of the present invention is a radio communication terminal which carries out a communication through a radio transmission medium with a radio communication terminal accommodating apparatus and is accommodated in the radio communication terminal accommodating apparatus and has:

self-terminal identification information transmitting means for transmitting identification information of a self-terminal; identification information acquiring means for acquiring identification information of a different radio communication terminal which can monitor a communication; and acquirement identification information transmitting means for transmitting the identification information of the different radio communication terminal to the radio communication terminal accommodating apparatus. Thus, the radio communication terminal accommodating apparatus can grasp the configuration of the entire radio communication system in the manner of the bird's-eye.

BRIEF DESCRIPTION OF THE DRAWINGS

FIG. 2 is a view showing a first example of a relation of a detection of an existence between radio communication terminals in the radio communication system shown in FIG. 2;

BEST MODE FOR CARRYING OUT THE INVENTION

Figure 1:
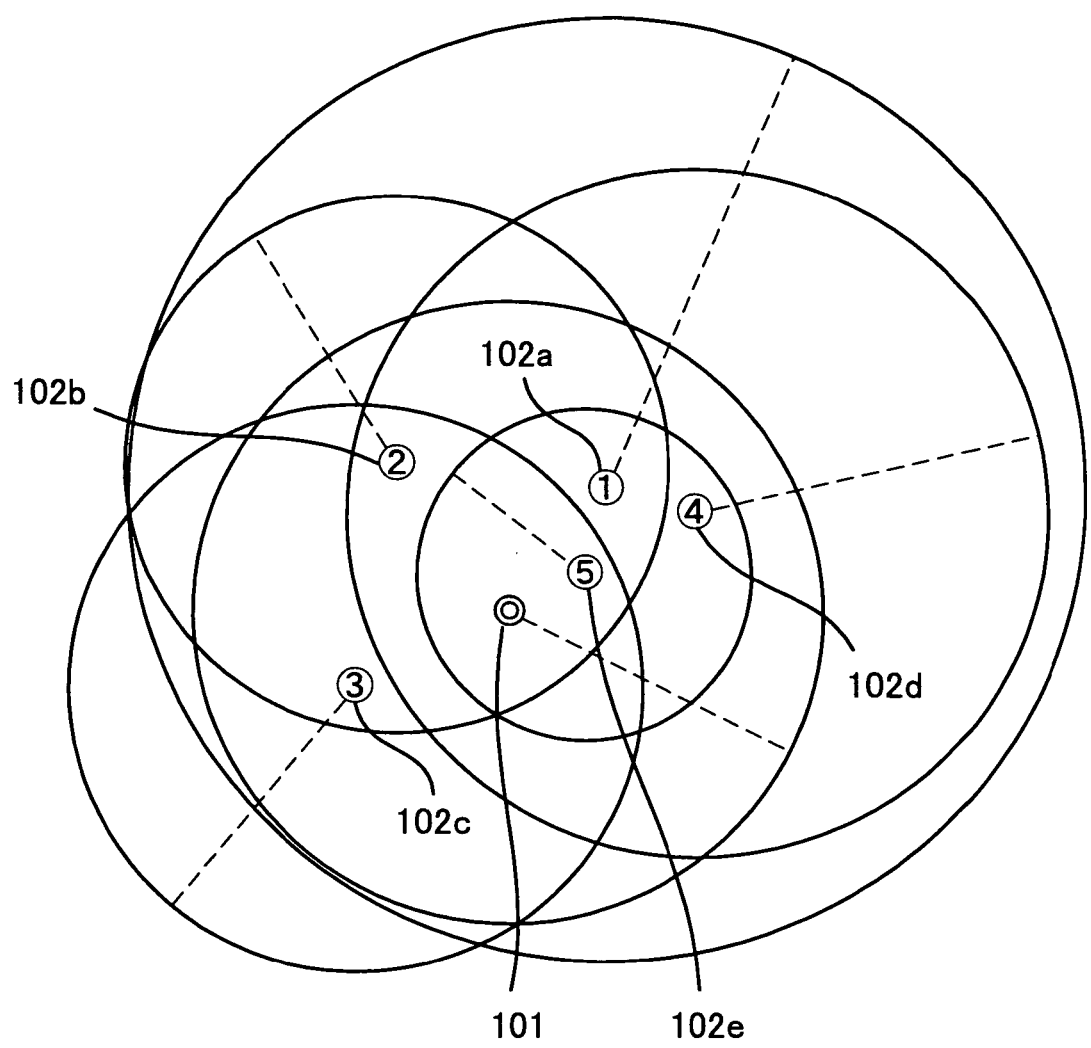
FIG. 1 is a diagrammatic view showing a first example of a configuration of a radio communication system in an embodiment of the present invention.

An embodiment of the present invention will be explained below with reference to the drawings. FIG. 1 is a diagrammatic view showing a first example of a configuration of a radio communication system in the embodiment of the present invention. By the way, in order to make the explanation simpler, FIG. 1 shows the radio communication system provided with one radio communication terminal accommodating apparatus 101 and five radio communication terminals 102a to 102e and diagrammatically draws those communication ranges. Also, numbers (1) to (5) are assigned to the five radio communication terminals 102a to 102e, respectively. By the way, in the drawing, the numbers (1) to (5) assigned to the radio communication terminals 102a to 102e are illustrated by numerals surrounded by rounds.

In FIG. 1, the one radio communication terminal accommodating apparatus 101 accommodates the five radio communication terminals 102a to 102e. The radio communication terminal accommodating apparatus 101 can mutually communicate with the respective radio communication terminals 102a to 102e. However, there are respective differences in communication environment, communication electric power and the like between the radio communication terminals 102a to 102e. Thus, the mutual communication is not always possible. Here, for example, let us suppose that the communication ranges of the respective radio communication terminals 102a to 102e are isotropic, as illustrated in FIG. 1.

By the way, the communication ranges of the radio communication terminals 102a to 102e are the radio signal arrival ranges where the contents included in the radio signals sent by the radio communication terminals 102a to 102e can be received at referable (usable) states. Thus, for example, the radio communication terminal 102c located within the communication range of the radio communication terminal 102b can receive the signal from the radio communication terminal 102b in the referable state. On the other hand, the radio communication terminal 102d located without the communication range of the radio communication terminal 102b cannot receive the radio signal from the radio communication terminal 102b in the referable state. Hence, for example, the radio communication terminal 102c can detect the existence of the radio communication terminal 102b. On the other hand, the radio communication terminal 102d cannot detect the existence of the radio communication terminal 102b.

In the case based on the definition of the foregoing communication range, the radio communication terminals 102a to 102e of the radio communication system shown in FIG. 1 can detect the mutual existences, respectively, as follows.

The radio communication terminal 102a detects the existences of the radio communication terminals 102b, 102d and 102e.

The radio communication terminal 102b detects the existences of the radio communication terminals 102a, 102c and 102d.

The radio communication terminal 102c detects the existences of the radio communication terminals 102a and 102b.

The radio communication terminal 102d detects the existences of the radio communication terminals 102a and 102e.

The radio communication terminal 102e detects the existences of the radio communication terminals 102a, 102b, 102c and 102d.

Also, FIG. 2 is a view showing a first example of the relation of the detection of the existence between the radio communication terminals in the radio communication system shown in FIG. 1. The left column of FIG. 2 indicates a main body of the detection, and the top column indicates a target of the detection. Then, if the main body of the detection can detect the existence of the target of the detection, [○] is noted, and if the main body of the detection cannot detect the existence of the target of the detection, [X] is noted.

Figure 3:
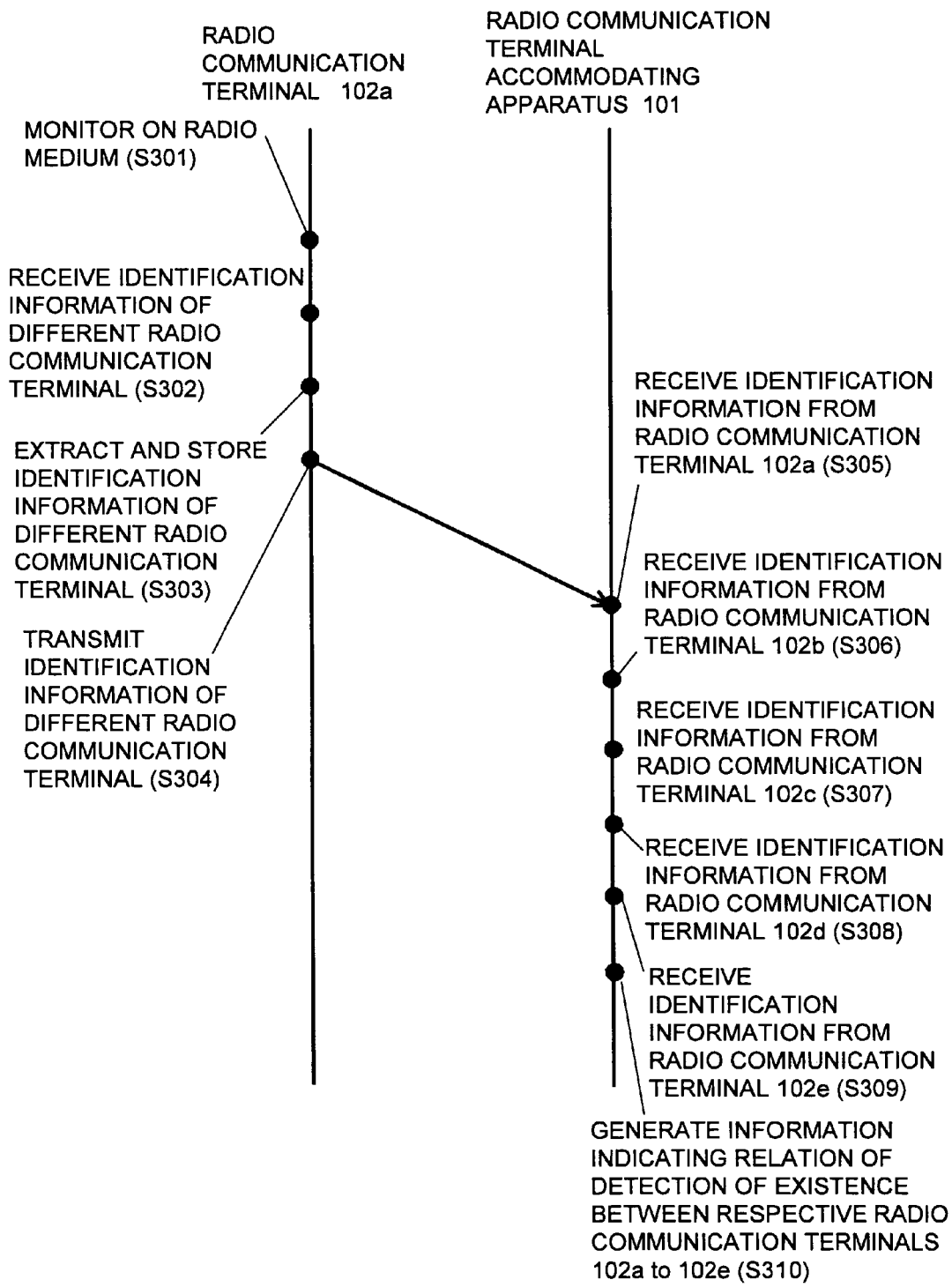
FIG. 3 is a sequence chart for a radio communication terminal accommodating apparatus in the embodiment of the present invention to grasp the relation of the detection of the existence between the radio communication terminals.

In order that the radio communication terminal accommodating apparatus 101 can grasp the relation of the detection between the radio communication terminals 102a to 102e as shown in FIG. 2 in the manner of bird's-eye, for example, a process based on a sequence chart shown in FIG. 3 may be executed. FIG. 3 is the sequence chart for the radio communication terminal accommodating apparatus in the embodiment of the present invention to grasp the relation of the detection of the existence between the radio communication terminals. In order to simplify the explanation, FIG. 3 shows the flow of the operations of the radio communication terminal accommodating apparatus 101 and radio communication terminal 102a, the operations of the other radio communication terminals 102b to 102e are equal to the operation of the radio communication terminal 102a.

The radio communication terminal 102a periodically monitors on a radio medium (Step S301), receives the information in which identification information of a different radio communication terminal, such as management information and the like that are transmitted by the different radio communication terminal, is included (Step S302) and extracts the identification information of the different radio communication terminal from this information and then stores in predetermined information storing means (Step S303). Consequently, the radio communication terminal 102a can collect the detectable identification information of the radio communication terminals (in the case of the situation shown in FIG. 1, the radio communication terminals 102b, 102d and 102e) existing around the self-terminal. By the way, in order that the similar process can be executed in the different radio communication terminal, the radio communication terminal 102a also transmits the management information including the identification information of the self-terminal and the like onto the transmission medium.

Also, although it is not shown, if the identification information related to a particular radio communication terminal cannot be received over a predetermined period, the identification information of the particular radio communication terminal stored in the predetermined information storing means is deleted. By the way, as this identification information, any information can be used. For example, MACID defined globally and singly, a connection ID set by the radio communication terminal accommodating apparatus, and the like can be used. Then, the identification information can be also extracted from a transmission frame in which data is being communicated with the radio communication terminal or the different radio communication terminal, in addition to the management information of the radio communication terminal.

Then, the radio communication terminal 102a transmits the identification information of all of the different radio communication terminals whose existences are detected by the processes of the steps S301 to S303 to the radio communication terminal accommodating apparatus 101 (Step S304). As a timing when the radio communication terminal 102a transmits the identification information of this radio communication terminal to the radio communication terminal accommodating apparatus 101, for example, a periodic transmission, a transmission at any timing, a transmission when it is requested by the radio communication terminal accommodating apparatus, a transmission if the existence of the radio communication terminal is newly detected or if the existence of the particular radio communication terminal is not detected, and the like are listed. Also, the difference of the identification information of the radio communication terminal (only updated identification information) can be also sent.

On the other hand, the radio communication terminal accommodating apparatus 101 receives the identification information sent by the radio communication terminal 102*a* at the step S304 (Step S305). Also, similarly, it receives the identification information sent from the radio communication terminals 102*b*, 102*c*, 102*d* and 102*e* (Steps S306 to S309) and generates the information indicating the relation of the detection of the existence between the respective radio communication terminals 102*a* to 102*e* as shown in FIG. 2, in accordance with the identification information received at the steps S305 to S309 and then grasps the relation of the detection of the existence between the respective radio communication terminals 102*a* to 102*e* (Step S310). With the above-mentioned processes, the radio communication terminal accommodating apparatus 101 can grasp the relation of the detection between the radio communication terminals 102*a* to 102*e* as shown in FIG. 2 in the manner of the bird's-eye. By the way, the table shown in FIG. 2 is only virtual. Thus, the radio communication terminal accommodating apparatus 101 is not required to actually prepare.

Figures 4, 5:
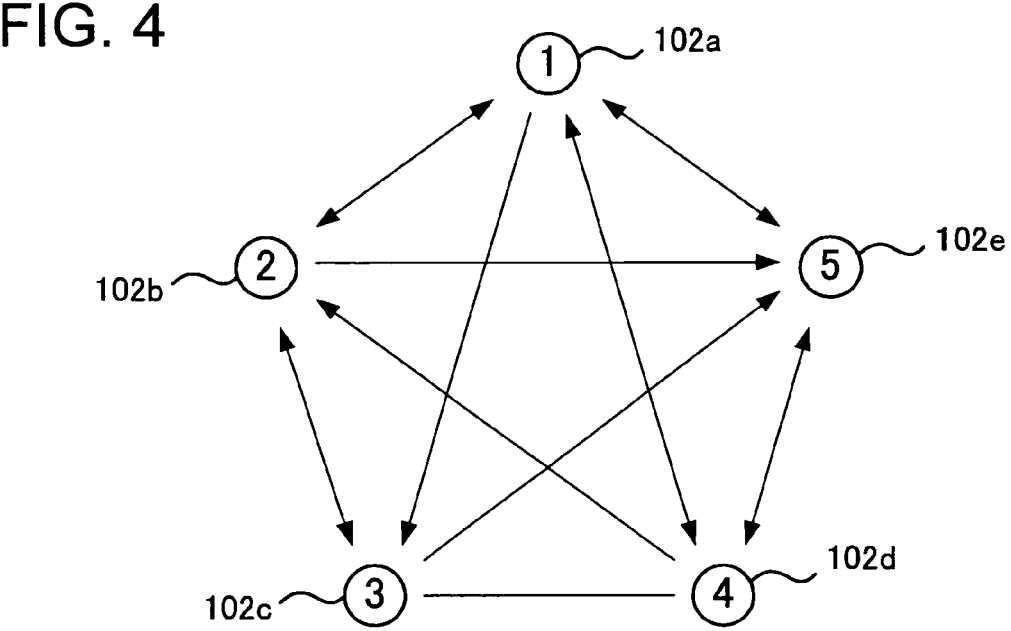
FIG. 4 is a view diagrammatically showing the relation of the detection of the existence shown in FIG. 2.
FIG. 5 is a view showing a second example of the relation of the detection of the existence between the radio communication terminals in the radio communication system shown in FIG. 1.

Also, FIG. 4 is a view diagrammatically showing the relation of the detection of the existence shown in FIG. 2. FIG. 4 shows the relation between the radio communication terminals 102*a* to 102*e* inside the radio communication system in the drawing. Also, if a signal is delivered from one radio communication terminal to the different radio communication terminal (if the different radio communication terminal exists within the communication range of the one radio communication terminal), an arrow is given from the one radio communication terminal to the different radio communication terminal. As shown in FIG. 4, for example, by retrieving a route that can be drawn with a single stroke of a pen (for example, (1)→(3)→(5)→(4)→(2)) through all of the radio communication terminals 102*a* to 102*e*, the radio communication terminal accommodating apparatus 101 can discover the route through all of the radio communication terminals 102*a* to 102*e*.

Also, if the radio communication terminal accommodating apparatus 101 receives the information related to the change in the detection of the existence of the different radio communication terminal from the radio communication terminals 102*a* to 102*e* in association with time elapse, the radio communication terminal accommodating apparatus 101 can grasp the time change of the communication environment in the transmission medium and further detect the movements of the radio communication terminals 102*a* to 102*e*.

Also, if the different radio communication terminal accommodating apparatus and radio communication terminal and the like exist around the radio communication system provided with the radio communication terminal accommodating apparatus 101 and the radio communication terminals 102*a* to 102*e*, there is a possibility that the identification information received from the radio communication terminals 102*a* to 102*e* at the steps S305 to S309 includes the identification information related to the radio communication terminal accommodating apparatus and radio communication terminal around them. That is, the radio communication terminal accommodating apparatus 101 can grasp the existence of the radio communication terminal existing around the radio communication system by the series of processes of the sequence chart shown in FIG. 3 and can also grasp with which of the radio communication terminals 102*a* to 102*e* inside the radio communication system the radio communication terminal can communicate.

Also, FIG. 5 is a view showing a second example of the relation of the detection of the existence between the radio communication terminals in the radio communication system shown in FIG. 1. For example, in FIG. 1 and FIG. 2, if any reason (for example, the time change of the communication environment) deteriorates the communication environment from the radio communication terminal 102*a* to the radio communication terminal 102*b*, a fact that the existence of the radio communication terminal 102*a* cannot be detected is reported from the radio communication terminal 102*b* to the radio communication terminal accommodating apparatus 101. At this time, under the assumption that the radio communication terminal 102*b* cannot detect the existence of the radio communication terminal 102*a*, in the table shown in FIG. 2, the [X] (the detection is impossible) is not immediately given. Then, each cell of the table shown in FIG. 2 is multi-valued, and for example, as shown in FIG. 5, it is noted as [?] (unclear). Then, if the existence is not detected even after the elapse of a predetermined time or more, the [X] can be firstly given.

Also, in the sequence chart shown in FIG. 3, at the steps S302 to S304, the radio communication terminal 101*a* receives and extracts the identification information of the different radio communication terminal and transmits the extracted information to the radio communication terminal accommodating apparatus 101. However, by expanding the information treated at these steps S302 to S304, the radio communication terminal accommodating apparatus 101 can collect the various information from the respective radio communication terminals 102*a* to 102*e* that are accommodated.

For example, since the radio communication terminals 102*a* to 102*e* detect a signal level (an electric power level of a signal), an error rate or the like of the management information and the like which are received from the different radio communication terminal and transmit its detection result to the radio communication terminal accommodating apparatus 101, the radio communication terminal accommodating apparatus 101 can grasp the communication environment between the respective radio communication terminals 102*a* to 102*e* and multi-value the value of each cell in the table shown in FIG. 2 in accordance with the signal level, the error rate or the like.

By the way, as mentioned above, as the information which each of the radio communication terminals 102*a* to 102*e* transmits to the radio communication terminal accommodating apparatus 101, other than the electric power level and error rate of the signal related to the signal received from the above-mentioned different radio communication terminal and radio communication terminal accommodating apparatus, for example, if variation amounts of the electric power level and error rate, a direction where the different radio communication terminal exists, a variation amount of the direction, and a radio communication terminal accommodating apparatus different from the radio communication terminal accommodating apparatus 101 of the radio communication system are detected, the information with regard to that radio communication terminal accommodating apparatus and the like can be also used.

Also, the above-mentioned explanation describes the case where the information transmitted to the radio communication terminal accommodating apparatus 101 from the radio communication terminals 102*a* to 102*e* is the information related to the communication with the different radio communication terminals 102*a* to 102*e* and radio communication terminal accommodating apparatus 101. However, the information related to the communication performances of the radio communication terminals 102a to 102e themselves can be also transmitted to the radio communication terminal accommodating apparatus 101. That is, each of the radio communication terminals 102a to 102e can use a movement direction and a movement speed of the radio communication terminal, a kind of a communication interface possessed by the radio communication terminal, a directivity of an antenna of the radio communication terminal and the like can be also used as the information to be transmitted to the radio communication terminal accommodating apparatus 101.

By the way, when the information related to the communication with the different radio communication terminals 102a to 102e or radio communication terminal accommodating apparatus 101 as mentioned above, or the information related to the communication performances of the radio communication terminals 102a to 102e themselves are received from the radio communication terminals 102a to 102e, the radio communication terminal accommodating apparatus 101 summarizes those information, for example, in the table as shown in FIG. 2 as mentioned above and can consequently grasp the communication state in the radio communication system and the communication performances and movement manners of the respective radio communication terminals 102a to 102e in the manner of the bird's-eye.

Figure 6:
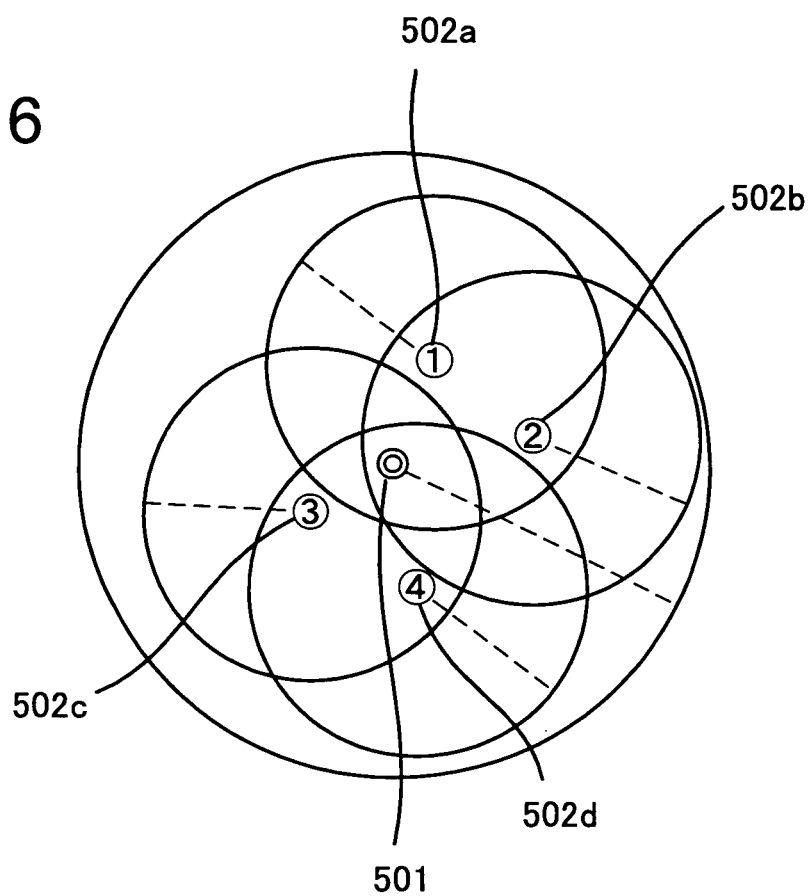
FIG. 6 is a diagrammatic view showing a second example of the configuration of the radio communication system in the embodiment of the present invention.
Figure 7:
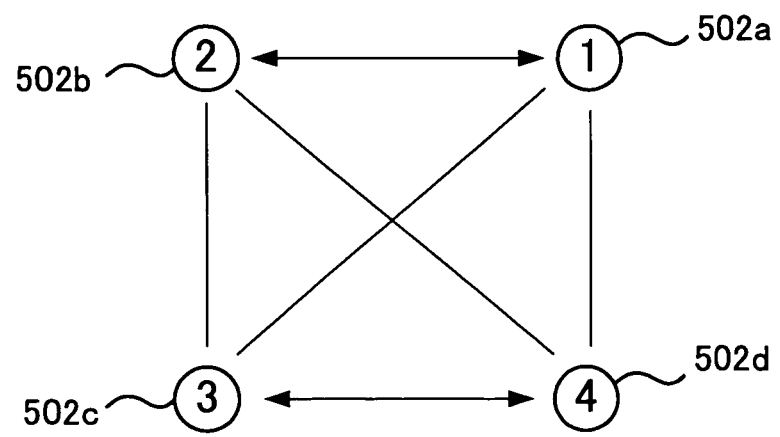
FIG. 7 is a view showing the relation of the detection of the existence between the radio communication terminals in the radio communication system shown in FIG. 6.

Also, FIG. 6 is a diagrammatic view showing the second example of the configuration of the radio communication system in the embodiment of the present invention, and FIG. 7 is a view showing the relation of the detection of the existence between the radio communication terminals in the radio communication system shown in FIG. 6. In the case of the radio communication system as shown in FIG. 6, with the series of processes of the sequence chart shown in FIG. 3, a radio communication terminal accommodating apparatus 501 can grasp that a communication between a radio communication terminal 502a and a radio communication terminal 502b has no influence on a communication between a radio communication terminal 502c and a radio communication terminal 502d. Thus, in this case, the radio communication terminal accommodating apparatus 501 can report a command for instructing the direct communication (side stream) between the radio communication terminal 502a and the radio communication terminal 502b and the direct communication (side stream) between the radio communication terminal 502c and the radio communication terminal 502d to be executed at the same time, to the respective combinations

INDUSTRIAL APPLICABILITY

As described above, the radio communication method, radio communication terminal accommodating apparatus and radio communication terminal of the present invention can grasp the configuration of the entire radio communication system in the manner of the bird's-eye, and are useful as the radio communication method in the radio communication system which uses the radio communication and carries out the transmission/reception of the data between the plurality of radio communication terminals, and the radio communication terminal accommodating apparatus constituting the radio communication system.

The invention claimed is:

1. A radio communication terminal which is accommodated in a radio communication terminal accommodating apparatus and carries out a communication with a different radio communication terminal, the radio communication terminal comprising:
a reception section that receives identification information of said different radio communication terminal;
a detection section that detects information related to the communication with said different radio communication terminal by the reception of said identification information of said different radio communication terminal; and
a transmission section that transmits identification information of said radio communication terminal, said received identification information of said different radio communication terminal and said detected information related to the communication with said different radio communication terminal, to said radio communication terminal accommodating apparatus,
wherein said detected information related to the communication with said different radio communication terminal includes any one of: an electric power level of a signal which said radio communication terminal receives from said different radio communication terminal; an error rate of the signal which said radio communication terminal receives from said different radio communication terminal; a variation amount in said electric power level or said error rate; a direction from a position of said radio communication terminal to a position of said different radio communication terminal; and a variation amount in said direction.

2. The radio communication terminal according to claim 1, wherein said transmission section further transmits information related to communication performance of said radio communication terminal to said radio communication terminal accommodating apparatus.

3. The radio communication terminal according to claim 1, wherein said transmission section periodically transmits said received identification information of said different radio communication terminal to said radio communication terminal accommodating apparatus.

4. The radio communication terminal according to claim 1, wherein said transmission section periodically transmits said detected information related to the communication with said different radio communication terminal to said radio communication terminal accommodating apparatus.

5. The radio communication terminal according to claim 2, wherein said information related to the communication performance of said radio communication terminal includes any one of: a movement direction or movement speed of said radio communication terminal; a kind of a communication interface possessed by said radio communication terminal; a transmission directivity that can be generated by said radio communication terminal; and a reception directivity.

6. The radio communication terminal according to claim 2, further comprising:
a communication performance information acquiring section that acquires the information related to the communication performance of said radio communication terminal; wherein
said transmission section transmits said acquired information related to the communication performance of said radio communication terminal to said radio communication terminal accommodating apparatus.

7. A radio communication terminal accommodating apparatus, which carries out a communication with a radio communication terminal, the radio communication terminal accommodating apparatus comprising:
a reception section that receives identification information of said radio communication terminal, identification information of a different radio communication terminal, which carries out a communication with said radio communication terminal, and first information related to a communication between said radio communication terminal and said different radio communication terminal, from said radio communication terminal;

a detection section that detects the existence of radio communication terminals, in accordance with said identification information of said radio communication terminal and said identification information of said different radio communication terminal;

a correlation generation section that, based on the detected existence, generates information indicating a relation between said radio communication terminal and said different radio communication terminal; and a communication information generation section that generates second information related to said communication between said radio communication terminal and said different radio communication terminal, in accordance with said first information related to the communication between said radio communication terminal and said different radio communication terminal, wherein said first information related to the communication between said radio communication terminal and said different radio communication terminal includes any one of: an electric power level of a signal which said radio communication terminal receives from said different radio communication terminal; an error rate of the signal which said radio communication terminal receives from said different radio communication terminal; a variation amount in said electric power level or said error rate; a direction from a position of said radio communication terminal to a position of said different radio communication terminal; and a variation amount in said direction.

8. The radio communication terminal accommodating apparatus according to claim 7, wherein;

the reception section further receives information related to communication performance of said radio communication terminal from said radio communication terminal accommodating apparatus; and the communication information generation section generates the second information related to said communication between said radio communication terminal and said different radio communication terminal, in accordance with said first information related to the communication between said radio communication terminal and said different radio communication terminal and said information related to said communication performance of said radio communication terminal.

9. The radio communication terminal accommodating apparatus according to claim 7, wherein:

the reception section periodically receives said identification information of said different radio communication terminal from said radio communication terminal; and the correlation generation section generates information indicating a time change in said relation of said detected existence between said radio communication terminal and said different radio communication terminal.

10. The radio communication terminal accommodating apparatus according to claim 7, wherein:

the reception section periodically receives said first information related to the communication with said different radio communication terminal from said radio communication terminal; and the communication information generation section generates information indicating a time change in communication state between said radio communication terminal and said different radio communication terminal.

11. The radio communication terminal accommodating apparatus according to claim 7, further comprising an acquirement section that acquires third information related to a communication between said radio communication terminal and said different radio communication terminal, in accordance with said received first information related to the communication between said radio communication terminal and said different radio communication terminal, and is located around said radio communication terminal.

12. The radio communication terminal accommodating apparatus according to claim 8, wherein said information related to the communication performance of said radio communication terminal includes any one of: a movement direction or movement speed of said radio communication terminal; a kind of a communication interface possessed by said radio communication terminal; a transmission directivity that can be generated by said radio communication terminal; and a reception directivity.

13. The radio communication terminal accommodating apparatus according to claim 7, further comprising a communication control section that determines whether a first communication between a first radio communication terminal and a second radio communication terminal does not overlap with a second communication between a third radio communication terminal and a fourth radio communication terminal, by referring to said information indicating the relation between said radio communication terminals, and if it is determined that said first radio communication does not overlap with said second radio communication, allows said first communication and said second communication to be communicated simultaneously and independently.

14. A radio communication method performed in a radio communication terminal which is accommodated in a radio communication terminal accommodating apparatus and carries out a communication with a different radio communication terminal, the method comprising:

receiving identification information of said different radio communication terminal;

detecting information related to the communication with said different radio communication terminal by the reception of said identification information of said different radio communication terminal; and transmitting identification information of said radio communication terminal, said received identification information of said different radio communication terminal and said detected information related to the communication with said different radio communication terminal, to said radio communication terminal accommodating apparatus, wherein said detected information related to the communication with said different radio communication terminal includes any one of: an electric power level of a signal which said radio communication terminal receives from said different radio communication terminal; an error rate of the signal which said radio communication terminal receives from said different radio communication terminal; a variation amount in said electric power level or said error rate; a direction from a position of said radio communication terminal to a position of said different radio communication terminal; and a variation amount in said direction.

15. A radio communication method performed in a radio communication terminal accommodating apparatus which carries out a communication with a radio communication terminal, the method comprising:

receiving identification information of said radio communication terminal, identification information of a different radio communication terminal, and first information related to a communication between said radio communication terminal and the different radio communication terminal, from said radio communication terminal;

detecting an existence of radio communication terminals, in accordance with said identification information of said radio communication terminal and said identification information of said different radio communication terminal;

generating information indicating a relation of said detected existence between said radio communication terminal and said different radio communication terminal; and generating second information related to said communication between said radio communication terminal and said different radio communication terminal, in accordance with said first information related to the communication between said radio communication terminal and said different radio communication terminal, wherein said first information related to the communication between said radio communication terminal and said different radio communication terminal includes any one of: an electric power level of a signal which said radio communication terminal receives from said different radio communication terminal; an error rate of the signal which said radio communication terminal receives from said different radio communication terminal; a variation amount in said electric power level or said error rate; a direction from a position of said radio communication terminal to a position of said different radio communication terminal; and a variation amount in said direction.

* * * * *

UNITED STATES PATENT AND TRADEMARK OFFICE
CERTIFICATE OF CORRECTION

| | | |
|---|---|---|
| PATENT NO. | : 8,023,476 B2 | Page 1 of 1 |
| APPLICATION NO. | : 10/571200 | |
| DATED | : September 20, 2011 | |
| INVENTOR(S) | : Jun Hirano et al. | |

It is certified that error appears in the above-identified patent and that said Letters Patent is hereby corrected as shown below:

Claim 8, column 15, line 33, reads:

"apparatus according to claim 7, wherein;"

and should read:

"apparatus according to claim 7, wherein:"

Signed and Sealed this
Nineteenth Day of June, 2012

David J. Kappos
*Director of the United States Patent and Trademark Office*